United States Patent
Rabinovich et al.

(10) Patent No.: US 8,803,527 B2
(45) Date of Patent: *Aug. 12, 2014

(54) USE OF ELECTRODES AND MULTI-FREQUENCY FOCUSING TO CORRECT ECCENTRICITY AND MISALIGNMENT EFFECTS ON TRANSVERSAL INDUCTION MEASUREMENTS

(75) Inventors: Michael B. Rabinovich, Houston, TX (US); Alexandre N. Bespalov, Spring, TX (US); Stanislav W. Forgang, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 163 days.

This patent is subject to a terminal disclaimer.

(21) Appl. No.: 13/417,892

(22) Filed: Mar. 12, 2012

(65) Prior Publication Data

US 2012/0169344 A1   Jul. 5, 2012

Related U.S. Application Data

(63) Continuation of application No. 12/125,784, filed on May 22, 2008, which is a continuation-in-part of application No. 11/598,305, filed on Nov. 13, 2006, now Pat. No. 7,554,328.

(51) Int. Cl.
*G01V 3/00* (2006.01)

(52) U.S. Cl.
USPC ........... 324/333; 324/325; 324/329; 324/335; 324/338; 324/366; 702/7; 702/9; 702/12; 175/40; 175/45; 175/50

(58) Field of Classification Search
USPC .................. 324/323–375; 250/253–266; 175/40–50; 702/7, 9, 12; 343/703, 709, 343/718–719
See application file for complete search history.

(56) References Cited

U.S. PATENT DOCUMENTS

| | | | |
|---|---|---|---|
| 4,302,722 A | 11/1981 | Gianzero | |
| 4,651,101 A | 3/1987 | Barber et al. | |
| 4,837,517 A | 6/1989 | Barber | |
| 5,041,975 A * | 8/1991 | Minerbo et al. | 702/7 |
| 5,157,605 A | 10/1992 | Chandler et al. | |
| 5,463,319 A * | 10/1995 | Chesnutt et al. | 324/339 |
| 5,508,616 A * | 4/1996 | Sato et al. | 324/343 |
| 5,523,939 A | 6/1996 | Stephenson | |
| 5,600,246 A | 2/1997 | Forgang et al. | |

(Continued)

OTHER PUBLICATIONS

Barber, T. et al., Determining Formation Resistivity Anisotrophy in the Presence of Invasion, SPE 90526, SPE Annual Techinical Conference and Exhibition, Houston, Texas Sep. 26-29, 2004, pp. 1-25.

(Continued)

*Primary Examiner* — Tung X Nguyen
*Assistant Examiner* — Thang Le
(74) *Attorney, Agent, or Firm* — Mossman Kumar & Tyler PC (57) ABSTRACT

A multicomponent induction logging tool uses a nonconducting mandrel. A central conducting member including wires that electrically connect at least one of the antennas to another of the antennas. Electrodes disposed about the transmitter antenna form a conductive path through a borehole fluid to the central conducting member.

15 Claims, 5 Drawing Sheets

(56) References Cited

U.S. PATENT DOCUMENTS

| | | | |
|---|---|---|---|
| 5,757,191 A * | 5/1998 | Gianzero | 324/339 |
| 5,814,988 A | 9/1998 | Itskovich et al. | |
| 5,841,280 A | 11/1998 | Yu et al. | |
| 6,470,274 B1 | 10/2002 | Mollison et al. | |
| 6,493,632 B1 | 12/2002 | Mollison et al. | |
| 6,502,036 B2 | 12/2002 | Zhang et al. | |
| 6,541,979 B2 | 4/2003 | Omeragic | |
| 6,573,722 B2 | 6/2003 | Rosthal et al. | |
| 6,636,045 B2 | 10/2003 | Tabarovsky et al. | |
| 6,643,589 B2 | 11/2003 | Zhang et al. | |
| 6,646,441 B2 | 11/2003 | Thompson et al. | |
| 6,667,620 B2 * | 12/2003 | Homan et al. | 324/339 |
| 6,686,736 B2 | 2/2004 | Schoen et al. | |
| 6,693,430 B2 | 2/2004 | Rosthal et al. | |
| 6,836,218 B2 | 12/2004 | Frey et al. | |
| 6,911,824 B2 * | 6/2005 | Bittar | 324/338 |
| 6,925,384 B2 | 8/2005 | Frenkel et al. | |
| 6,933,726 B2 * | 8/2005 | Chen et al. | 324/339 |
| 6,998,844 B2 | 2/2006 | Omeragic et al. | |
| 7,388,382 B2 | 6/2008 | Strack et al. | |
| 7,619,540 B2 * | 11/2009 | Bonner et al. | 340/853.1 |
| 7,629,791 B2 | 12/2009 | Bespalov et al. | |
| 7,629,792 B2 | 12/2009 | Pelegri et al. | |
| 7,629,793 B2 | 12/2009 | Pelegri et al. | |
| 7,696,757 B2 | 4/2010 | Itskovich et al. | |
| 7,778,778 B2 | 8/2010 | Bespalov et al. | |
| 7,839,346 B2 * | 11/2010 | Bittar et al. | 343/719 |
| 7,912,648 B2 * | 3/2011 | Tang et al. | 702/7 |
| 8,427,164 B2 * | 4/2013 | Fang et al. | 324/338 |
| 2003/0141872 A1 | 7/2003 | Clark et al. | |
| 2003/0155924 A1 * | 8/2003 | Rosthal et al. | 324/366 |
| 2005/0049791 A1 | 3/2005 | Bespalov et al. | |
| 2005/0083064 A1 | 4/2005 | Homan et al. | |
| 2005/0083161 A1 | 4/2005 | Minerbo et al. | |
| 2005/0088181 A1 * | 4/2005 | Barber et al. | 324/346 |
| 2005/0256644 A1 | 11/2005 | Xiao | |
| 2006/0119364 A1 * | 6/2006 | Chen et al. | 324/338 |
| 2008/0224707 A1 | 9/2008 | Wisler et al. | |
| 2010/0017133 A1 * | 1/2010 | Ziolkowski et al. | 702/7 |
| 2013/0027045 A1 * | 1/2013 | Tabarovsky et al. | 324/366 |

OTHER PUBLICATIONS

Moran, J. H. et al., Basic Theory of Induction Logging and Application to Study of Two-Coil Sondes, Geophysics, col. XXVII, No. 6, Part 1 (Dec. 1962), pp. 829-858.

\* cited by examiner

USE OF ELECTRODES AND MULTI-FREQUENCY FOCUSING TO CORRECT ECCENTRICITY AND MISALIGNMENT EFFECTS ON TRANSVERSAL INDUCTION MEASUREMENTS

CROSS-REFERENCES TO RELATED APPLICATIONS

This application is a continuation of U.S. patent application Ser. No. 12/125,784, filed May 22, 2008, which is a continuation-in-part of U.S. Pat. No. 7,554,328, filed Nov. 13, 2006.

BACKGROUND OF THE INVENTION

1. Field of the Invention

The invention is related generally to the use of multi-component resistivity measurements for determination of properties of earth formations. In particular, the present invention discusses a method of reducing the non-formation parasite effects in multi-component resistivity measurements.

2. Background of the Art

Electromagnetic induction resistivity well logging instruments are well known in the art. Electromagnetic induction resistivity well logging instruments are used to determine the electrical conductivity, and its converse, resistivity, of earth formations penetrated by a borehole. Formation conductivity has been determined based on results of measuring the magnetic field of eddy currents that the instrument induces in the formation adjoining the borehole. The electrical conductivity is used for, among other reasons, inferring the fluid content of the earth formations. Typically, lower conductivity (higher resistivity) is associated with hydrocarbon-bearing earth formations. The physical principles of electromagnetic induction well logging are well described, for example, in, J. H. Moran and K. S. Kunz, *Basic Theory of Induction Logging and Application to Study of Two-Coil Sondes*, Geophysics, vol. 27, No. 6, part 1, pp. 829-858, Society of Exploration Geophysicists, December 1962. Many improvements and modifications to electromagnetic induction resistivity instruments described in the Moran and Kunz reference, supra, have been devised, some of which are described, for example, in U.S. Pat. No. 4,837,517 to Barber, in U.S. Pat. No. 5,157,605 to Chandler et al., and in U.S. Pat. No. 5,600,246 to Fanini et al.

Conventional induction well logging techniques employ a metal pipe inside a coil mandrel. One or more transmitter coils are energized by an alternating current. The oscillating magnetic field produced by this arrangement results in the induction of currents in the formations which are nearly proportional to the conductivity of the formations. These currents, in turn, contribute to the voltage induced in one or more receiver coils. By selecting only the voltage component which is in phase with the transmitter current, a signal is obtained that is approximately proportional to the formation conductivity. In a conventional induction logging apparatus, the basic transmitter coil and receiver coil have axes which are aligned with the longitudinal axis of the well logging device. (For simplicity of explanation, it will be assumed that the borehole axis is aligned with the axis of the logging device, and that these are both in the vertical direction. Also single coils will subsequently be referred to without regard for focusing coils or the like.) This arrangement tends to induce secondary current loops in the formations that are concentric with the vertically oriented transmitting and receiving coils. The resultant conductivity measurements are indicative of the horizontal conductivity (or resistivity) of the surrounding formations. There are, however, various formations encountered in well logging which have a conductivity that is anisotropic. Anisotropy results from the manner in which formation beds were deposited by nature. For example, "uniaxial anisotropy" is characterized by a difference between the horizontal conductivity, in a plane parallel to the bedding plane, and the vertical conductivity, in a direction that is commonly perpendicular to the bedding plane. When there is no bedding dip, horizontal resistivity can be considered to be in the plane perpendicular to the borehole, and the vertical resistivity in the direction parallel to the borehole. Conventional induction logging devices, which tend to be sensitive only to the horizontal conductivity of the formations, do not provide a measure of vertical conductivity or of anisotropy. Techniques have been developed to determine formation anisotropy. See, e.g. U.S. Pat. No. 4,302,722 to Gianzero et al. Transverse anisotropy often occurs such that variations in resistivity occur in the azimuthal direction.

Multi-component signals can be used for interpreting formation resistivities and petrophysical parameters. The principles used for this interpretation have been discussed, for example, in U.S. Pat. No. 6,470,274 to Mollison et al., U.S. Pat. No. 6,643,589 to Zhang et al., U.S. Pat. No. 6,636,045 to Tabarovsky et al., the contents of which are incorporated herein by reference. Specifically, the parameters estimated may include horizontal and vertical resistivities (or conductivities), relative dip angles, strike angles, sand and shale content and water saturation. In addition, U.S. patent application Ser. No. 11/125,530 of Rabinovich et al. teaches the use of multi-component measurements for analysis of fractured earth formations that may also have anisotropic layers. These multi-component signals are typically obtained using a multi-component measurement tool having coils oriented transverse to the tool axis in addition to coils oriented parallel to the tool axis.

Figure 3A:
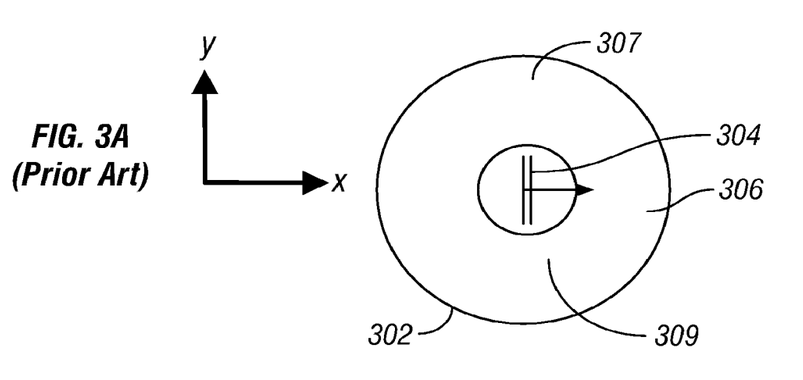
FIGS. 3A-C (Prior Art) show a cross-sectional view of an induction tool at different locations within a borehole.
Figure 3B:
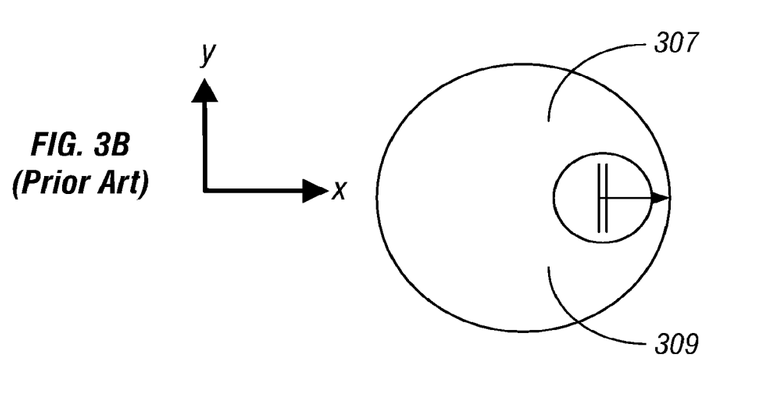
Figure 3C:
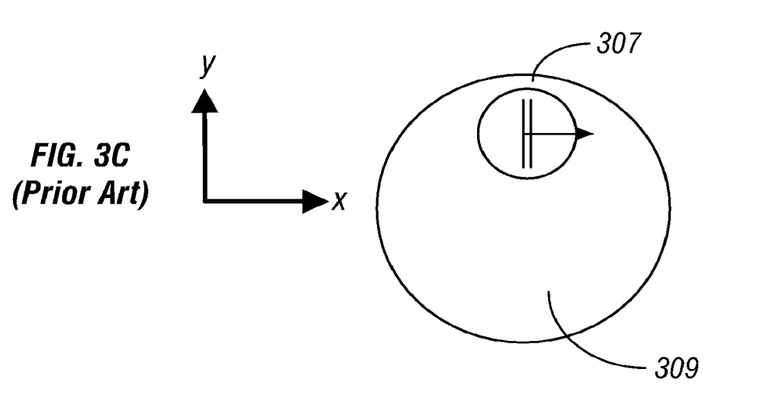

In addition to formation response, resistivity measurements can be affected by magnetic fields that arise from non-formation effects. Two such non-formation effects result from tool eccentricity within the borehole and coil misalignment with respect to the tool axis. Induction tools generally give rise to a current flow in the conductive drilling mud that surrounds the tool and fills the borehole. Tool eccentricity generally causes more problems to transverse (X or Y) coils than to axial (Z) coils. FIGS. 3A-C show cross-sectional views of an induction tool having a non-conductive mandrel at different positions within a borehole. FIG. 3A shows an x-oriented tool 304 that is centered within the borehole 302 filled with mud 306. In one aspect, the current induced in the borehole generally flows along the axial channel 307 and in the opposite direction along the axial channel 309. Due to the symmetry of the current flow channels (307 and 309), the centered induction tool does not experience an eccentricity effect. In FIG. 3B, the tool is decentralized along the x-direction. Due to the orientation of the transmitter, the current flowing along channels 307 and 309 still displays symmetry and thus this eccentricity generally does not affect the measurements much. FIG. 3C shows the induction tool decentralized along the y-axis, such that channel 307 is constricted while the lower channel is broadened 309. Additionally, current flowing in channel 307 may interact with the formation. Thus, the borehole current flow is highly affected due to decentralization along the y-axis. The net borehole current induces signals in transverse receiver coils, especially coplanar transmission and receiver coils. The net current may also induce signals in axial receiver coils that are at different axial positions from the transverse transmitter coil. Because the induction current density increases with increasing mud conductivity, the net current-induced signals are stronger for higher mud conductivity.

The eccentricity effects may be reduced by using a conductive mandrel. However, such a conductive mandrel is highly susceptible to the effects of coil misalignment. The coil misalignment effect is due to the position of coils with respect to the tool axis or inner pipe. Induction tool coils are typically disposed on a pipe which may be of a highly conductive metal. The pipe serves several purposes, such as protecting and shielding through-wires and supporting the tool weight. A transverse transmitter coil induces an induction current in the pipe if the pipe forms a closed loop with other paths of electric current. However, the pipe current does not necessarily distort the tool measurement. If the receiver coil, coplanar with the transmitter coil, is symmetric with respect to the pipe axis, the measurement is typically not affected. The pipe induction current affects the measurement only if the receiver coil also is asymmetric with respect to the pipe axis. An orthogonal transverse receiver coil may also be affected by coil misalignment. In addition to the coil misalignment error caused by the pipe eddy current, misaligned orthogonal coils will also induce direct coupling between the coils.

U.S. patent application Ser. No. 11/598,305 of Wang et al, having the same assignee as the present disclosure teaches the use of a conductive outer sleeve provided with a plurality of openings on the mandrel to reduce the effect of currents flowing in the borehole fluid. One drawback is that the sleeve is insulated from the metal pipe, so that the compensation may not be effective for all values of the current in the metal pipe. The present disclosure addresses this potential drawback.

SUMMARY OF THE INVENTION

One embodiment of the disclosure is an apparatus for determining a resistivity property of an earth formation. The apparatus includes a logging tool having a non-conductive mandrel, a transmitter antenna, a pair of receiver antennas, a central conducting member including wires that electrically connect at least one of the antennas to another of the antennas, and a pair of electrodes disposed about the transmitter antenna forming a conductive path through a borehole fluid to the central conducting member. The transmitter antenna may have an axis inclined at a nonzero angle to an axis of the logging tool. One of the pair of receiver antennas may be a bucking antenna. The receiver antennas may have axes inclined at a nonzero angle to an axis of the logging tool. The apparatus may include a conveyance device configured to convey the logging tool into a borehole in the earth formation, the conveyance device selected from (i) a wireline, and (ii) a drilling tubular. The apparatus may further include a processor configured to activate the transmitter antenna at a plurality of frequencies, perform a multifrequency focusing (MFF) of signals received by the receiver antennas, and determine the resistivity property of the earth formation from the results of the MFF.

Another embodiment is a method of determining a resistivity property of an earth formation. The method includes conveying a logging tool having a non-conductive mandrel, a transmitter antenna, a pair of receiver antennas and a central conducting member including wires that connect at least one of the antennas to another of the antennas, into a borehole; positioning a pair of electrodes about the transmitter antenna and forming a conductive path through a borehole fluid to the central conducting member; activating the transmitter antenna; producing signals in the pair of receiver antennas responsive to the activation of the transmitter antenna; and determining the property of the earth formation from the produced signals. The method may include using for the transmitter antenna, an antenna with an axis inclined at a nonzero angle to an axis of the logging tool. The method may include using one of the pair of receiver antennas as a bucking antenna. The method may include using, as the receiver antennas, antennas with axes inclined at a nonzero angle to an axis of the logging tool. The method may include conveying the logging tool into a borehole in the earth formation using a conveyance device selected from (i) a wireline, and (ii) a drilling tubular. Determining the property may be done by operating the transmitter antenna at a plurality of frequencies; performing a multifrequency focusing (MFF) of signals received by the receiver antennas; and determining the resistivity property of the earth formation from the results of the MFF. The property may be a vertical resistivity, a horizontal resistivity, a sand fraction, a water saturation, a formation dip, and/or an azimuth.

Another embodiment is a computer readable medium for use with an apparatus for determining a property of an earth formation. The apparatus includes a logging tool having a non-conductive mandrel, a transmitter antenna; a pair of receiver antennas; a central conducting member including wires that electrically connect at least one of the antennas to another of the antennas; and a pair of electrodes disposed about the transmitter antenna forming a conductive path through a borehole fluid to the central conducting member. The medium includes instructions that enable a processor to determine from signals received by the pair of receiver antennas resulting from activation of the transmitter antenna the property of the earth formation. The medium may be a ROM, an EPROM, an EEPROM, a flash memory, and/or an optical disk.

BRIEF DESCRIPTION OF THE FIGURES

The present invention is best understood with reference to the following figures in which like numbers refer to like components and in which.

DETAILED DESCRIPTION OF THE INVENTION

Figure 1:
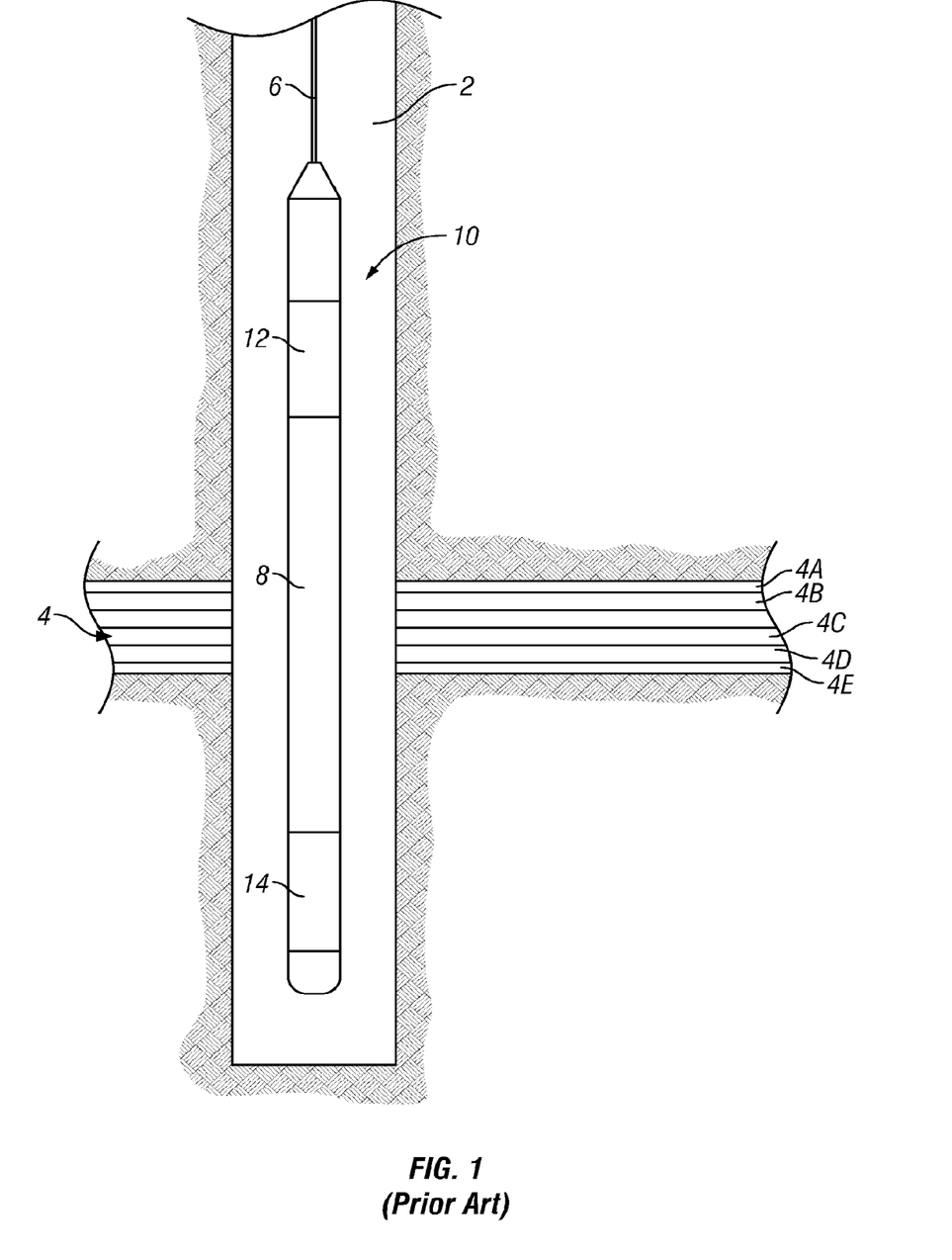
FIG. 1 (Prior Art) illustrates an induction instrument disposed in a borehole penetrating an earth formation.

Referring now to FIG. 1, an electromagnetic induction well logging instrument 10 is shown disposed in a wellbore 2 drilled through earth formations. The earth formations are shown generally at 4. The instrument 10 can be lowered into and withdrawn from the wellbore 2 by use of an armored electrical cable 6 or similar conveyance known in the art. The instrument 10 can be assembled from three subsections: an auxiliary electronics unit 14 disposed at one end of the instrument 10; a coil mandrel unit 8 attached to the auxiliary electronics unit 14; and a receiver/signal processing/telemetry electronics unit 12 attached to the other end of the coil mandrel unit 8, this unit 12 typically being attached to the cable 6.

The coil mandrel unit 8 includes induction transmitter and receiver coils, as will be further explained, for inducing electromagnetic fields in the earth formations 4 and for receiving voltage signals induced by eddy currents flowing in the earth formations 4 as a result of the electromagnetic fields induced therein.

The auxiliary electronics unit 14 can include a signal generator and power amplifiers (not shown) to cause alternating currents of selected frequencies to flow through transmitter coils in the coil mandrel unit 8. A processor which controls the operation of the tool and processing acquired data may be part of the electronics unit. Alternatively, some or all of the processing and control may be done by a surface processor.

The receiver/signal processing/telemetry electronics unit 12 can include receiver circuits (not shown) for detecting voltages induced in receiver coils in the coil mandrel unit 8, and circuits for processing these received voltages (not shown) into signals representative of the conductivities of various layers, shown as 4A through 4F of the earth formations 4. As a matter of convenience the receiver/signal processing/telemetry electronics unit 12 can include signal telemetry to transmit the conductivity—related signals to the earth's surface along the cable 6 for further processing, or alternatively can store the conductivity related signals in an appropriate recording device (not shown) for processing after the instrument 10 is withdrawn from the wellbore 2.

Figure 2:
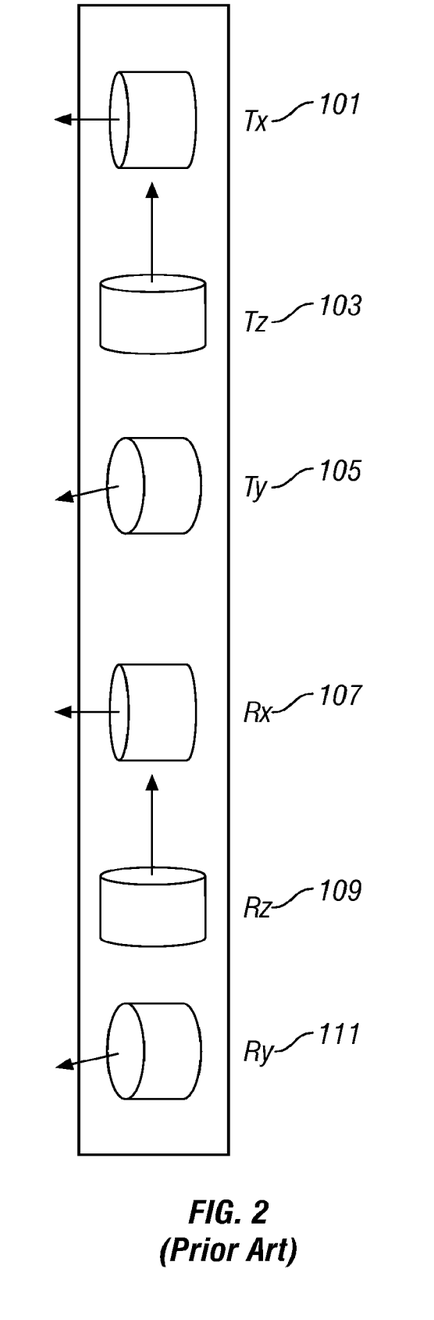
FIG. 2 (Prior Art) illustrates the arrangement of transmitter and receiver coils in a multi-component induction logging tool marketed under the name 3DExplorer®.

Referring to FIG. 2, the configuration of transmitter and receiver coils in the 3DEX® multi-component induction logging instrument of Baker Hughes Incorporated is shown. This is for exemplary purposes only, and any multi-component tool may be used. Three orthogonal transmitters 101, 103 and 105 that are referred to as the $T_x$, $T_z$, and $T_y$ transmitters are shown (the z-axis is the longitudinal axis of the tool). Corresponding to the transmitters 101, 103 and 105 are associated receivers 107, 109 and 111, referred to as the $R_x$, $R_z$, and $R_y$ receivers, for measuring the corresponding magnetic fields. Magnetic fields induced by a transmitter are subsequently recorded at a selected receiver. The magnetic field is generally referred to with indices indicating the orientation of the transmitter used and the orientation of the receiver used. Thus $H_{xy}$, for example, indicates the response of a field generated by the $T_x$ transmitter and subsequently recorded at the $R_y$ receiver. In one mode of operation of the tool, the $H_{xx}$, $H_{yy}$, $H_{zz}$, $H_{xy}$, and $H_{xz}$ components are measured, though other components may also be used. It should be noted that the method of the present invention may also be used with non-orthogonal configurations of transmitters and receivers. Well known coordinate rotation methods may be used with such non-orthogonal measurements to rotate them into the desired orientation. For the purposes of the present invention, all such measurements (orthogonal and non-orthogonal) will be referred to as multi-component measurements.

Figure 4:
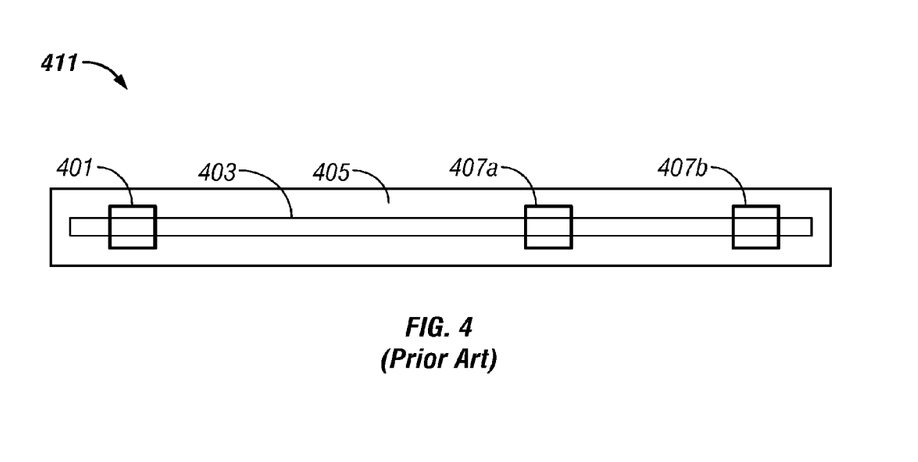
FIG. 4 (Prior Art) shows an exemplary prior art multicomponent tool with a nonconductive mandrel and an internal metal pipe not connected to the borehole fluid.

FIG. 4 shows an exemplary multicomponent logging tool 411 having a transmitter 401 and a receiver array comprised of antennas 407a, 407b. One of these may be a bucking antenna and the other a measuring antenna. The conducting pipe is indicated by 403 and the insulation by 405.

Figure 5:
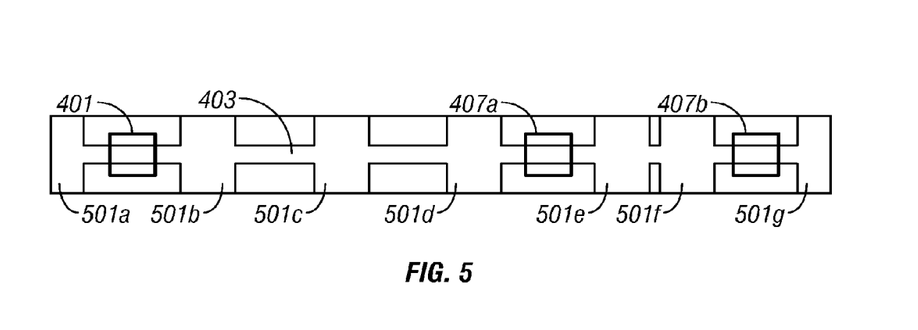
FIG. 5 shows an exemplary multicomponent tool with a nonconductive mandrel and an internal metal pipe electrically connected to the borehole fluid using electrodes placed above, below, and in-between transmitter and receiver coils.
Figure 6:
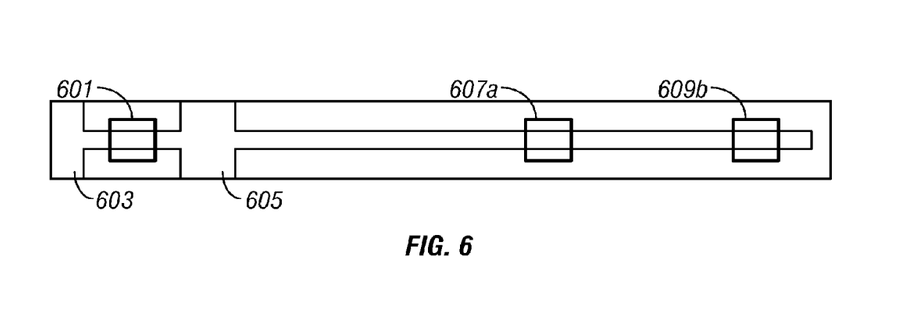
FIG. 6 illustrates a logging tool with only two electrodes above and below a transmitter suitable for multifrequency measurements and multifrequency focusing.

FIG. 5 shows an exemplary multicomponent tool in which the tool of FIG. 4 has been provided with electrodes 501a, 501b, 501c, 501d, 501e, 501f and 501g that couple the conducting tube 403 to the exterior of the tool and the borehole fluid. These electrodes are positioned above and below the transmitter and receiver antennas as well as in-between the antennas. This has a superficial similarity to the sheet used in Wang which simply acts as a Faraday shield, the arrangement of FIG. 5 ensures that there will be a potential gradient in the borehole fluid that is the same as that in the metal pipe. A third arrangement investigated is illustrated in FIG. 6 and only has electrodes 603, 606 on either side of the transmitter antenna 601 and no electrodes proximate to the receiver antennas. Multifrequency measurements were simulated using this tool and multifrequency focusing (MFF) was applied.

Figure 7:
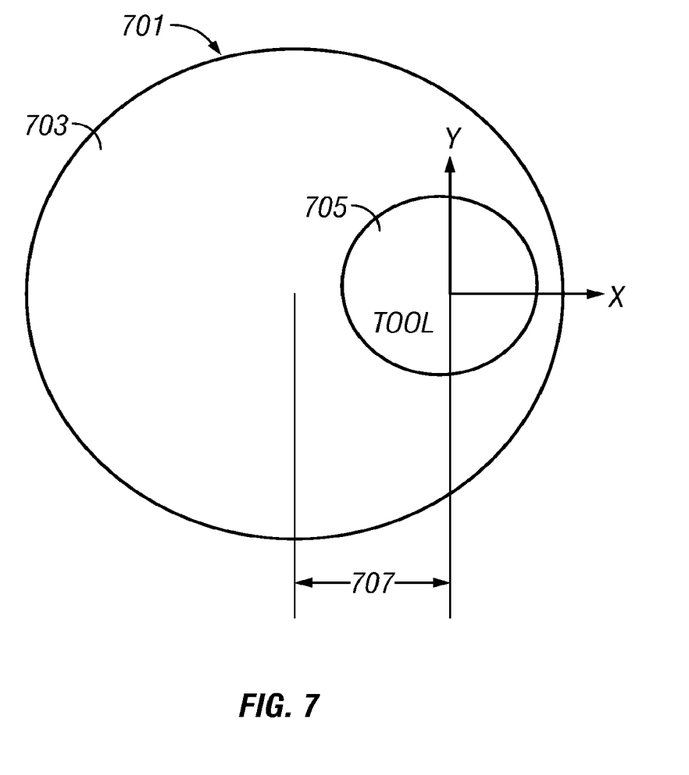
FIG. 7 shows the model used for evaluating the tool configurations of FIGS. 4-6.

The model of the eccentered tool is illustrated in FIG. 7. The formation has a conductivity of 60 mS/m while the borehole fluid 703 has a conductivity of 5000 mS/m. The borehole 701 has a diameter of 8 in. (20.32 cm) and the tool 705 is eccentered by a distance 707.

The results of numerical simulations for all three tool configurations are presented in Tables 1, 2, and 3 respectively. For each configuration we consider models without a borehole, with a borehole and a perfectly centralized tool, and with a borehole and an eccentered tool. For the tool configurations with electrodes (Tables 2 and 3) we also consider a case with a borehole and a centralized tool when both receiver and transmitter coils are misaligned by 1 mm from the tool axis. Since the tool without electrodes is not affected by misalignment, we do not present these calculations.

We can observe that the tool without electrodes (Table 1) is very sensitive to eccentricity—a single frequency response for the eccentered case is almost 10 times larger than for the centralized case (Ra/Rt: 7.67 vs 0.795). The MFF with 3 terms can mostly compensate for it, but it requires very accurate measurements for this amount of compensation. We can see that the MFF with 4 and 5 terms start oscillating which indicates insufficient accuracy of the data for required depth of compensation. It means that this approach won't work for real data with the normal tool and measurement errors.

TABLE 1

Numerical simulation results for the tool without electrodes

| | The 1$^{st}$ frequency 20.8 kHz | | | MFF/Rt, number of terms: | | | |
|---|---|---|---|---|---|---|---|
|  | $H_s$ | $H_L$ | calibrated | 2 | 3 | 4 | 5 |
| No borehole | −4.73e−4 | −1.89e−5 | 1.239e−4 (.821) | 0.949 | 1.009 | 1.007 | 1.031 |
| Borehole, no eccen. | −7.29e−4 | −8.45e−5 | 1.201e−4 (.795) | 0.978 | 1.016 | 1.012 | 1.016 |
| Borehole, eccen, 2" | 2.16e−3 | 1.45e−3 | 1.158e−3 (7.67) | 1.879 | 1.060 | 0.883 | 1.378 |

The tool with multiple electrodes (Table 2) shows very little sensitivity to the eccentricity (0.759 vs 0.765) but it is strongly affected by very small misalignment (0.759 vs 3.34). The MFF slightly improves the results but not enough for practical use. Also, oscillation of the MFF results for higher number of terms indicates excessive compensation of the signals and consequently requirements for unachievable accuracy of the measurements.

TABLE 2

Numerical simulation results for the tool with multiple electrodes

| | The 1st frequency 20.8 kHz | | | MFF/Rt, number of terms: | | | |
|---|---|---|---|---|---|---|---|
| | $H_s$ | $H_L$ | calibrated | 2 | 3 | 4 | 5 |
| No borehole | −3.11e−4 | 5.77e−5 | 1.239e−4 (.821) | 0.946 | 1.005 | 0.995 | 0.947 |
| Borehole, no eccen. | −6.31e−4 | −3.06e−5 | 1.146e−4 (.759) | 0.974 | 1.010 | 0.993 | 0.970 |
| Borehole, eccen, 2" | −6.87e−4 | −4.33e−5 | 1.155e−4 (.765) | 1.406 | 1.096 | 0.775 | 0.999 |
| Borehole, no eccen, T&$R_L$ misalign, 1 mm | −6.33e−4 | 3.97e−4 | 5.047e−4 (3.34) | 2.534 | 1.198 | 0.412 | 0.842 |

The numerical simulation for the tool with only two electrodes (Table 3) confirms our idea for a reasonable compromise. We can see that this configuration has almost no sensitivity to the tool misalignment (0.782 vs 0.777) and the effect of tool eccentricity, while quite apparent for single frequency measurements (0.782 vs 0.614), can be easily compensated by the MFF. The convergence of the MFF with the higher number of terms and low single frequency signals support acceptable compensation for the MFF transformation.

TABLE 3

Numerical simulation results for the tool with only two electrodes

| | The 1st frequency 20.8 kHz | | | MFF/Rt, number of terms: | | | |
|---|---|---|---|---|---|---|---|
| | $H_s$ | $H_L$ | calibrated | 2 | 3 | 4 | 5 |
| No borehole | −3.72e−4 | 2.37e−5 | 1.237e−4 (.819) | 0.949 | 1.011 | 0.998 | 0.984 |
| Borehole, no eccen. | −6.65e−4 | −5.31e−5 | 1.181e−4 (.782) | 0.978 | 1.015 | 1.004 | 0.987 |
| Borehole, eccen, 2" | −7.01e−4 | −8.56e−5 | 9.265e−5 (.614) | 0.171 | 1.114 | 1.033 | 0.913 |
| Borehole, no eccen, T&$R_L$ misalign, 1 mm | −6.67e−4 | −5.43e−5 | 1.173e−4 (.777) | 0.978 | 1.007 | 0.980 | 0.910 |

The invention may also be implemented in conjunction with a measurement-while-drilling arrangement in which the multi-component and multi-array measurements are made using a suitable device on a bottomhole assembly conveyed on a drilling tubular such as a drillstring.

The measurements made by the logging tool may be used to determine a property of an earth formation. Methods of determination of such properties of the earth formation are discussed, for example, in U.S. Pat. No. 6,493,632 to Mollison et al., U.S. Pat. No. 6,470,274 to Mollison et al., and U.S. Pat. No. 6,686,736 to Schoen et al., having the same assignee as the present invention and the contents of which are incorporated herein by reference. Such properties include vertical and horizontal resistivities, sand fraction and water saturation. In addition, properties such as formation dip and azimuth may be determined using methods discussed in U.S. Pat. No. 6,643,589 to Zhang et al., having the same assignee as the present invention and the contents of which are incorporated herein by reference. The results of such analysis are output to a suitable medium and used for making decisions regarding reservoir development including well completion, running of other logs, and drilling of additional wells.

Implicit in the control and processing of the data is the use of a computer program on a suitable machine readable medium that enables the processors to perform the control and processing. The machine readable medium may include ROMs, EPROMs, EEPROMs, Flash Memories and Optical disks.

While the foregoing disclosure is directed to the preferred embodiments of the invention, various modifications will be apparent to those skilled in the art. It is intended that all variations within the scope of the appended claims be embraced by the foregoing disclosure.

The invention claimed is:

1. An apparatus for determining a resistivity property of an earth formation, the apparatus comprising:
   a logging tool having a non-conductive mandrel;
   a transmitter antenna;
   a pair of receiver antennas wherein an output of the pair of receiver antennas responsive to an activation of the transmitter antenna corrects for a misalignment of the transmitter antenna and the pair of receiver antennas;
   a central conducting member that electrically connect at least one of the receiver antennas to another of the receiver antennas; and
   a pair of electrodes disposed about the transmitter antenna forming a conductive path through a borehole fluid to the central conducting member.

2. The apparatus of claim 1, wherein the transmitter antenna further comprises an antenna with an axis inclined at a nonzero angle to an axis of the logging tool.

3. The apparatus of claim 1, wherein one of the pair of receiver antennas further comprises a bucking antenna.

4. The apparatus of claim 1, wherein the receiver antennas further comprise antennas with axes inclined at a nonzero angle to an axis of the logging tool.

5. The apparatus of claim 1, further comprising a conveyance device configured to convey the logging tool into a borehole in the earth formation, the conveyance device selected from (i) a wireline or (ii) a drilling tubular.

6. The apparatus of claim 1, further comprising a processor configured to:
- activate the transmitter antenna at a plurality of frequencies;
- perform a multi-frequency focusing (MFF) of signals received by the receiver antennas; and
- determine the resistivity property of the earth formation from the results of the MFF.

7. The apparatus of claim 1, wherein the property is selected from the group consisting of (i) a vertical resistivity, (ii) a horizontal resistivity, (iii) a sand fraction, (iv) a water saturation, (v) a formation dip, and (vi) an azimuth.

8. A method of determining a resistivity property of an earth formation, the method comprising:
- conveying a logging tool having a non-conductive mandrel, a transmitter antenna, a pair of receiver antennas and a central conducting member that connect at least one of the antennas to another of the antennas, into a borehole;
- positioning a pair of electrodes about the transmitter antenna and forming a conductive path through a borehole fluid to the central conducting member;
- activating the transmitter antenna at a plurality of frequencies;
- receiving signals in the pair of receiver antennas responsive to the activation of the transmitter antenna;
- performing a multi-frequency focusing (MFF) of the signals received from the receiver antennas; and
- determining the resistivity property of the earth formation using results of the MFF.

9. The method of claim 8, further comprising, using for the transmitter antenna, an antenna with an axis inclined at a nonzero angle to an axis of the logging tool.

10. The method of claim 8, further comprising using one of the pair of receiver antennas as a bucking antenna.

11. The method of claim 8, further comprising using, as the receiver antennas, antennas with axes inclined at a nonzero angle to an axis of the logging tool.

12. The method of claim 8, further comprising conveying the logging tool into a borehole in the earth formation using a conveyance device selected from (i) a wireline, or (ii) a drilling tubular.

13. The method of claim 8, wherein the property is selected from the group consisting of (i) a vertical resistivity, (ii) a horizontal resistivity, (iii) a sand fraction, (iv) a water saturation, (v) a formation dip, and (vi) an azimuth.

14. A non-transitory computer-readable medium product having thereon instructions that, when read by a processor, cause the processor to execute a method, the method comprising:
- conveying a logging tool having a non-conductive mandrel, a transmitter antenna, a pair of receiver antennas and a central conducting member that connect at least one of the antennas to another of the antennas, into a borehole;
- positioning a pair of electrodes about the transmitter antenna and forming a conductive path through a borehole fluid to the central conducting member;
- activating the transmitter antenna at a plurality of frequencies;
- receiving signals in the pair of receiver antennas responsive to the activation of the transmitter antenna;
- performing a multi-frequency focusing (MFF) of the signals received from the receiver antennas; and
- determining the resistivity property of the earth formation using results of the MFF.

15. The non-transitory computer-readable medium product of claim 14, further comprising at least one of (i) a ROM, (ii) an EPROM, (iii) an EEPROM, (iv) a flash memory, or (v) an optical disk.

\* \* \* \* \*